(12) United States Patent
    Jones

(10) Patent No.: US 11,121,435 B2
(45) Date of Patent: Sep. 14, 2021

(54) POUCH-TYPE BATTERY CELLS WITH WIDE CELL TABS

(71) Applicant: GM GLOBAL TECHNOLOGY OPERATIONS LLC, Detroit, MI (US)

(72) Inventor: Caleb A. Jones, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 16/454,446

(22) Filed: Jun. 27, 2019

(65) Prior Publication Data

US 2020/0411833 A1    Dec. 31, 2020

(51) Int. Cl.

| | |
|---|---|
| *B60L 50/64* | (2019.01) |
| *H01M 2/02* | (2006.01) |
| *H01M 2/06* | (2006.01) |
| *H01M 2/10* | (2006.01) |
| *H01M 2/20* | (2006.01) |
| *H01M 2/26* | (2006.01) |
| *H01M 50/531* | (2021.01) |
| *H01M 50/20* | (2021.01) |
| *H01M 50/124* | (2021.01) |
| *H01M 50/172* | (2021.01) |
| *H01M 50/502* | (2021.01) |

(52) U.S. Cl.
CPC .......... *H01M 50/531* (2021.01); *B60L 50/64* (2019.02); *H01M 50/124* (2021.01); *H01M 50/172* (2021.01); *H01M 50/20* (2021.01); *H01M 50/502* (2021.01); *H01M 2220/20* (2013.01)

(58) Field of Classification Search
None
See application file for complete search history.

(56) References Cited

U.S. PATENT DOCUMENTS

2014/0011060 A1* 1/2014 Yang .................. H01M 50/557
                                                    429/82

* cited by examiner

*Primary Examiner* — Haroon S. Sheikh
(74) *Attorney, Agent, or Firm* — Quinn IP Law

(57) ABSTRACT

Pouch-type battery cells include a first and second pouch layer, one or more electrode pairs between the two pouch layers, each pair including an anode and cathode current collector, a peripheral seal defined by a peripheral seal path and joining the two pouch layers to form a pouch encasing the one or more electrode pairs, an anode tab electrically coupled to one or more anode current collectors within the pouch and a cathode tab electrically coupled to one or more cathode current collectors within the pouch each extend outward from the peripheral seal. The anode and/or cathode tab include one or more apertures disposed along the peripheral seal path such that a portion of the peripheral seal is formed between the first and second pouch layers within the one or more apertures. The tabs of multiple battery cells can be electrically coupled via busbars to form a battery pack.

19 Claims, 5 Drawing Sheets

POUCH-TYPE BATTERY CELLS WITH WIDE CELL TABS

BACKGROUND

Assemblies of lithium-ion battery cells are finding increasing applications in providing motive power in automotive vehicles. Battery cells of various other chemistries, such as lithium-sulfur, are also candidates for such applications. Each cell of the battery is capable of providing an electrical potential of several volts (e.g., about three to four volts) and a direct electrical current based on the composition and mass of the electrode materials in the cell. The cell is capable of being discharged and re-charged over many cycles. A battery is assembled for an application by combining a suitable number of individual cells in a combination of electrical parallel and series connections to satisfy voltage and current requirements for a specified electric load, such as a traction motor for a vehicle.

In a battery application for an electrically powered vehicle, the assembled battery may, for example, comprise up to three hundred cells that are electrically interconnected to provide forty to four hundred volts and sufficient electrical power to an electrical traction motor to drive a vehicle. Sometimes, groups of battery cells are placed in pouches or packages for assembly and interconnection in forming a specified battery voltage and power requirement. There is a desire to reduce the cost of producing the respective elements of each electrochemical cell, and there is a continual desire to improve the function and reliability of each element of the battery.

SUMMARY

Provided are pouch-type battery cells including a first pouch layer, a second pouch layer, and one or more electrode pairs disposed between the first pouch layer and the second pouch layer. Each electrode pair can include an anode having an anode current collector and a cathode having a cathode current collector. The pouch-type battery cells further include a peripheral seal defined by a peripheral seal path and joining the first pouch layer and the second pouch layer to form a pouch encasing the one or more electrode pairs, an anode tab electrically coupled to the one or more anode current collectors within the pouch and extending outward from the peripheral seal of the pouch, and a cathode tab electrically coupled to the one or more cathode current collectors within the pouch and extending outward from the peripheral seal of the pouch. The anode tab and/or the cathode tab can include one or more apertures disposed along the peripheral seal path such that a portion of the peripheral seal is formed between the first pouch layer and the second pouch layer within the one or more apertures.

The anode tab and the cathode tab can each include one or more apertures disposed along the sealing path such that a portion of the peripheral seal is formed between the first pouch layer and the second pouch layer within the one or more apertures. The anode tab can include a plurality of apertures disposed along the sealing path such that a portion of the peripheral seal is formed between the first pouch layer and the second pouch layer within the plurality of apertures. The cathode tab can include a plurality of apertures disposed along the sealing path such that a portion of the peripheral seal is formed between the first pouch layer and the second pouch layer within the plurality of apertures. The peripheral seal can be formed by applying heat to the first outer corrosion resistant polymer layer or the second outer corrosion resistant polymer along the peripheral seal path. The first pouch layer and the second pouch layer can each include a first inner heat-activated polymer adhesive layer, a first middle aluminum layer, and a first outer corrosion resistant polymer layer. The anode tab can be disposed on a first side of the pouch-type battery cell and the cathode tab can be disposed on a second side of the pouch-type battery cell. The first side and the second side define a length, and wherein a width, defined perpendicular to the length, of the anode tab can be at least 80% of a width of one or more anode current collectors. The first side and the second side define a length, and wherein a width, defined perpendicular to the length, of the cathode tab can be at least 80% of a width of one or more cathode current collectors.

Battery packs are provided and include a plurality of pouch-type battery cells, each pouch-type battery cell having a first pouch layer, a second pouch layer, and one or more electrode pairs disposed between the first pouch layer and the second pouch layer. Each electrode pair includes an anode including an anode current collector and a cathode including a cathode current collector. The battery packs further include a peripheral seal defined by a peripheral seal path and joining the first pouch layer and the second pouch layer to form a pouch encasing the one or more electrode pairs, an anode tab electrically coupled to the one or more anode current collectors within the pouch and extending outward from the peripheral seal of the pouch, a cathode tab electrically coupled to the one or more cathode current collectors within the pouch and extending outward from the peripheral seal of the pouch, an anode busbar electrically coupled to a plurality of anode tabs, and a cathode busbar electrically coupled to a plurality of cathode tabs. The anode tab and/or the cathode tab of one or more pouch-type battery cells can include one or more apertures disposed along the peripheral seal path such that a portion of the peripheral seal is formed between the first pouch layer and the second pouch layer within the one or more apertures.

The anode tab and the cathode tab of one or more pouch-type battery cells can each include one or more apertures disposed along the sealing path such that a portion of the peripheral seal is formed between the first pouch layer and the second pouch layer within the one or more apertures. The anode tab of one or more pouch-type battery cells can include a plurality of apertures disposed along the sealing path such that a portion of the peripheral seal is formed between the first pouch layer and the second pouch layer within the plurality of apertures. The cathode tab of one or more pouch-type battery cells can include a plurality of apertures disposed along the sealing path such that a portion of the peripheral seal is formed between the first pouch layer and the second pouch layer within the plurality of apertures. The peripheral seal of one or more pouch-type battery cells can be formed by applying heat to the first outer corrosion resistant polymer layer or the second outer corrosion resistant polymer along the peripheral seal path. The first pouch layer and the second pouch layer of one or more pouch-type battery cells can each include a first inner heat-activated polymer adhesive layer, a first middle aluminum layer, and a first outer corrosion resistant polymer layer. The anode tab of one or more pouch-type battery cells can be disposed on a first side of each pouch-type battery cell and the cathode tab of one or more pouch-type battery cells is disposed on a second side of each pouch-type battery cell. The first side and the second side of each pouch-type battery cell defines a length, and wherein a width, defined perpendicular to the length, of the anode tab can be at least 80% of a width of one or more anode current collectors. The first side and the second side define a length, and wherein a width, defined perpendicular to the length, of the cathode tab can be at least 80% of a width of one or more cathode current collectors. The battery pack can power a vehicle.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are battery pouch-type cells comprising wide cells with apertures for enhancing the integrity and robustness of pouch seals. The wide cell tabs further enhance the electrical properties and performance of the pouch-type cells.

Figure 1:
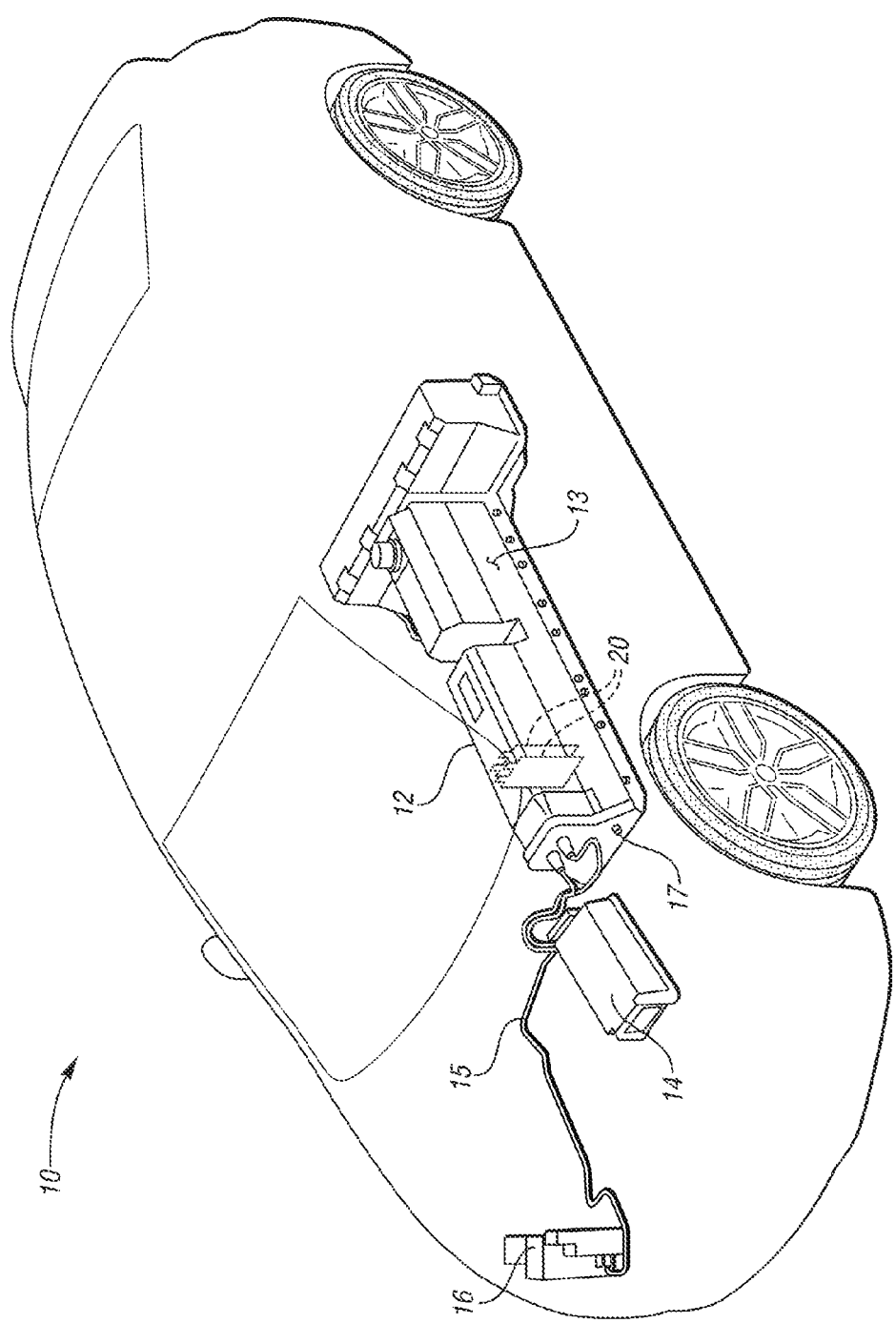
FIG. 1 illustrates a schematic perspective view of an electric vehicle, according to one or more embodiments.

FIG. 1 illustrates a schematic perspective view of an electric vehicle 10 having a direct current (DC) battery pack 12. The battery pack 12 includes a housing 13, e.g., a T-shaped housing as shown. The battery pack 12 may contain a plurality of identically-configured battery cells 20. One possible configuration of the battery pack 12 includes at least 192 such battery cells 20 collectively outputting at least 18 kWh of electrical power, although the battery pack 12 is not limited to such an embodiment. The housing 13 may be in fluid communication with a source of coolant (not shown), e.g., via a coolant port 17, with admitted coolant circulating with respect to the battery cells 20 to help regulate a temperature of the battery cells 20 of the battery pack 12. Other embodiments may be envisioned having different shapes, power ratings, and/or active materials other than lithium ion-based chemistries, and therefore the T-shaped configuration of FIG. 1 is exemplary and non-limiting.

The electric vehicle 10 of FIG. 1 may be configured as a mobile or a stationary system of any type that may benefit from the use of electrical energy stored in the various battery cells 20. Examples of the electric vehicle 10 may include a vehicle as shown, e.g., an extended-range electric vehicle, a plug-in hybrid electric vehicle, a battery electric vehicle, or another mobile platform, robot, or stationary/non-vehicular system such as a power plant.

The electric vehicle 10 may further include an electric machine (not shown) such as a traction motor and/or a motor/generator unit that is powered by energy from the battery pack 12. Additionally, the electric vehicle 10 may include a power inverter 14 that is electrically connected to a charging module 16 via high voltage cables 15. The power inverter 14 receives alternating current (AC) power from the charging module 16 when the charging module 16 is plugged into an available charging outlet (not shown). The power inverter 14 may use pulse-width modulation or other power switching techniques to transform the AC voltage from the charging module 16 into a DC voltage suitable for charging the battery cells 20, as is well known in the art.

Figure 2A:
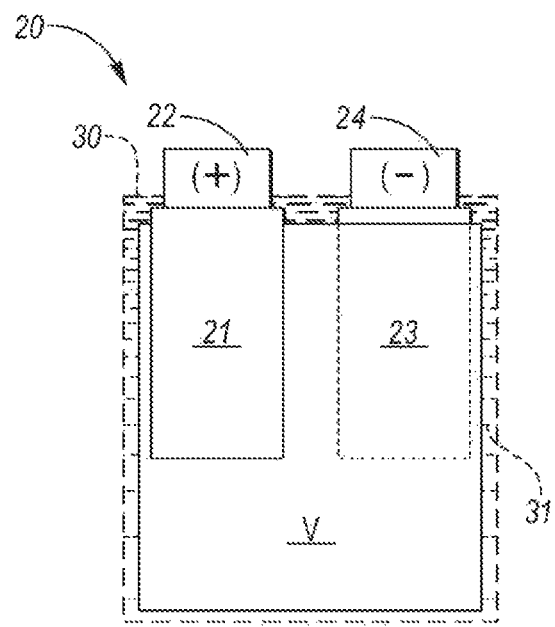
FIG. 2A illustrates a top view of a battery pouch cell, according to one or more embodiments.
Figure 2B:
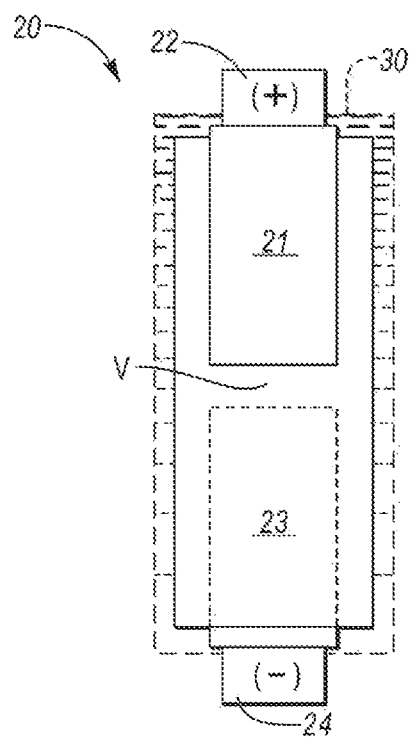
FIG. 2B illustrates a top view of a battery pouch cell, according to one or more embodiments.
Figure 3A:
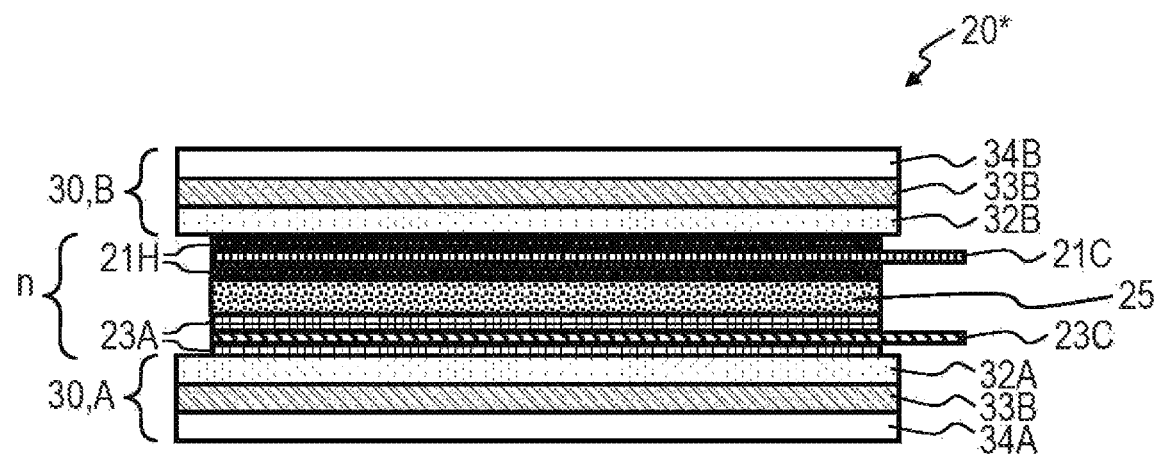
FIG. 3A illustrates a cross-sectional side-view of an unsealed battery pouch cell, according to one or more embodiments.
Figure 3B:
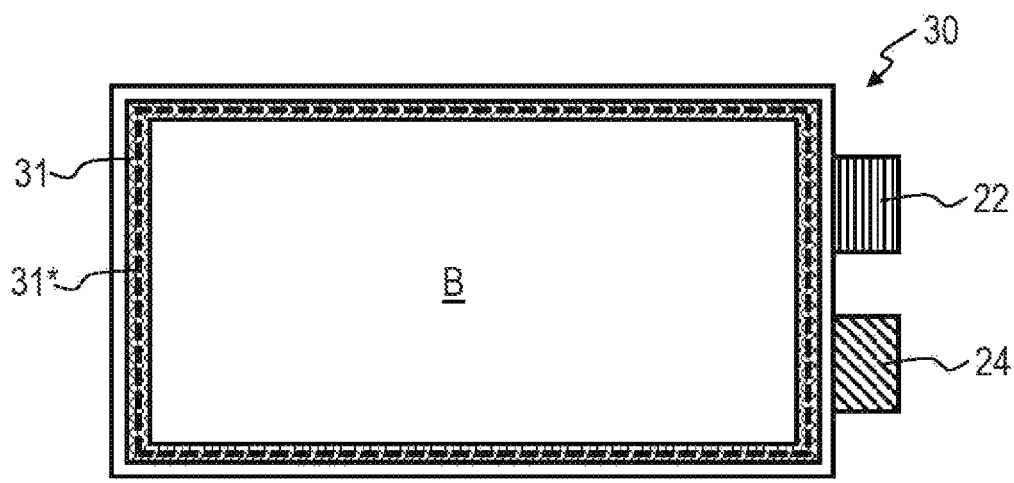
FIG. 3B illustrates a top view of a sealed battery pouch cell, according to one or more embodiments.

The battery pack 12 includes a plurality of pouch-type battery cells 20, two of which are shown in FIG. 1 for illustrative simplicity. FIGS. 2A-B each illustrate top views of examples of such battery cells 20. FIG. 3A illustrates a cross-sectional side-view of a battery cell 20 with an unsealed pouch 20*. FIG. 3B illustrates a top view of a sealed battery pouch cell 30, including a peripheral seal 31. Each battery cell 20 includes one or more (n) electrode pairs, each including an anode 21 and a cathode 23, contained within a sealed pouch 30. For example, a battery cell can include 20 to 30 electrode pairs contained within the sealed pouch 30, in some embodiments.

As illustrated in FIG. 3A, the pouch 30 comprises a first pouch layer A and a second pouch layer B. Each pouch layer A,B can include an inner heat-activated polymer adhesive layer 32A, 32B, a middle layer 33A, 33B, and an outer corrosion resistant polymer layer 34A,34B, for example, although it is understood that pouches comprising different compositions and orientations of layers are practicable. One or more electrode pairs, each electrode pair including an anode 21 and a cathode 23, are disposed between the first pouch layer A and the second pouch layer B. Heat can be applied to the outer corrosion resistant polymer layer 34A or 34B of the first pouch layer A or the second pouch layer B (e.g., via a laser, hot press, etc.) along a peripheral seal path 31* (see FIG. 3B) to form a peripheral seal 31 joining the first pouch layer A and the second pouch layer B to form a pouch 30 encasing the one or more electrode pairs.

In some embodiments, the outer corrosion resistant polymer layer(s) 34A and/or 34B can comprise a thickness of about 1 μm to about 100 μm. In some embodiments, the outer corrosion resistant polymer layer(s) 34A and/or 34B can comprise a thickness of about 10 μm. In general, the thickness of the outer corrosion resistant polymer layer(s) 34A and/or 34B is selected to provide suitable corrosion resistance protection to the respective middle layers 33A and 33B without adding undesirable weight or cost to the battery cell 20. The outer corrosion resistant polymer layer(s) 34A and/or 34B can comprise one or more polymeric materials such as polypropylene, polyethylene, high density polyethylene (HDPE), and low-density polyethylene (LDPE), among others. The outer corrosion resistant polymer layer(s) 34A and/or 34B can further comprise materials such as nylon to enhance the mechanical properties of the layer(s).

The middle layer(s) 33A and/or 33B can comprise aluminum, or any other metal which is malleable and able to be formed in thin sheets. In some embodiments, the middle layer(s) 33A and/or 33B can comprise a thickness of about 25 µm to about 200 µm, or about 50 µm to about 150 µm. In general, the thickness of the middle layer(s) 33A and/or 33B is selected to provide suitable mechanical properties without adding undesirable weight or cost to the battery cell 20. The middle layer(s) 33A and/or 33B can comprise pure aluminum, or aluminum alloys (e.g., 1100 or 3000 series aluminum alloys), and can be aluminum foils, in some embodiments.

In some embodiments, the inner heat-activated polymer adhesive layer(s) 32A and/or 32B can comprise a thickness of about 1 µm to about 100 µm, or about 10 µm. In general, the thickness of the inner heat-activated polymer adhesive layer(s) 32A and/or 32B is selected to enable sufficient melting of the layers via the heat source to subsequently adhere and form the peripheral seal 31 while not allowing direct contact between (i.e., insulating) the middle layers 33A and 33B, or between the middle layers 33A and 33B and the anode tab 22 or the cathode tab 24. The inner heat-activated polymer adhesive layer(s) 32A and/or 32B can comprise one or more polymeric materials, such as polypropylene, polyethylene, HDPE, and LDPE, among others, and additionally one or more adhesive materials, such as polyacrylate, polyacrylic, and carboxymethyl cellulose (CMC).

Each anode 21 comprises a current collector 21C with host material 21H applied thereto, and each cathode 23 comprises a current collector 23C with active material 23A applied thereto. The anode current collector 21C can comprise copper or copper alloys, for example. The cathode current collector 23 can comprise aluminum or aluminum alloys, for example. The pouch 30 includes a peripheral seal 31 defining an internal volume V, and is filled with electrolyte which contacts the host material 21H and active material 23A of each anode 21 and cathode, respectively 23. The anode 21 and cathode 23 are electrically isolated via a separator 25 which facilitates the movement of electrolyte and ions within the electrolyte between the anode 21 and the cathode 23. Various orientations of cell electrodes are possible, including the side-by-side configuration illustrated in FIG. 2A or the end-to-end configuration illustrated in FIG. 2B, among others.

Figure 4A:
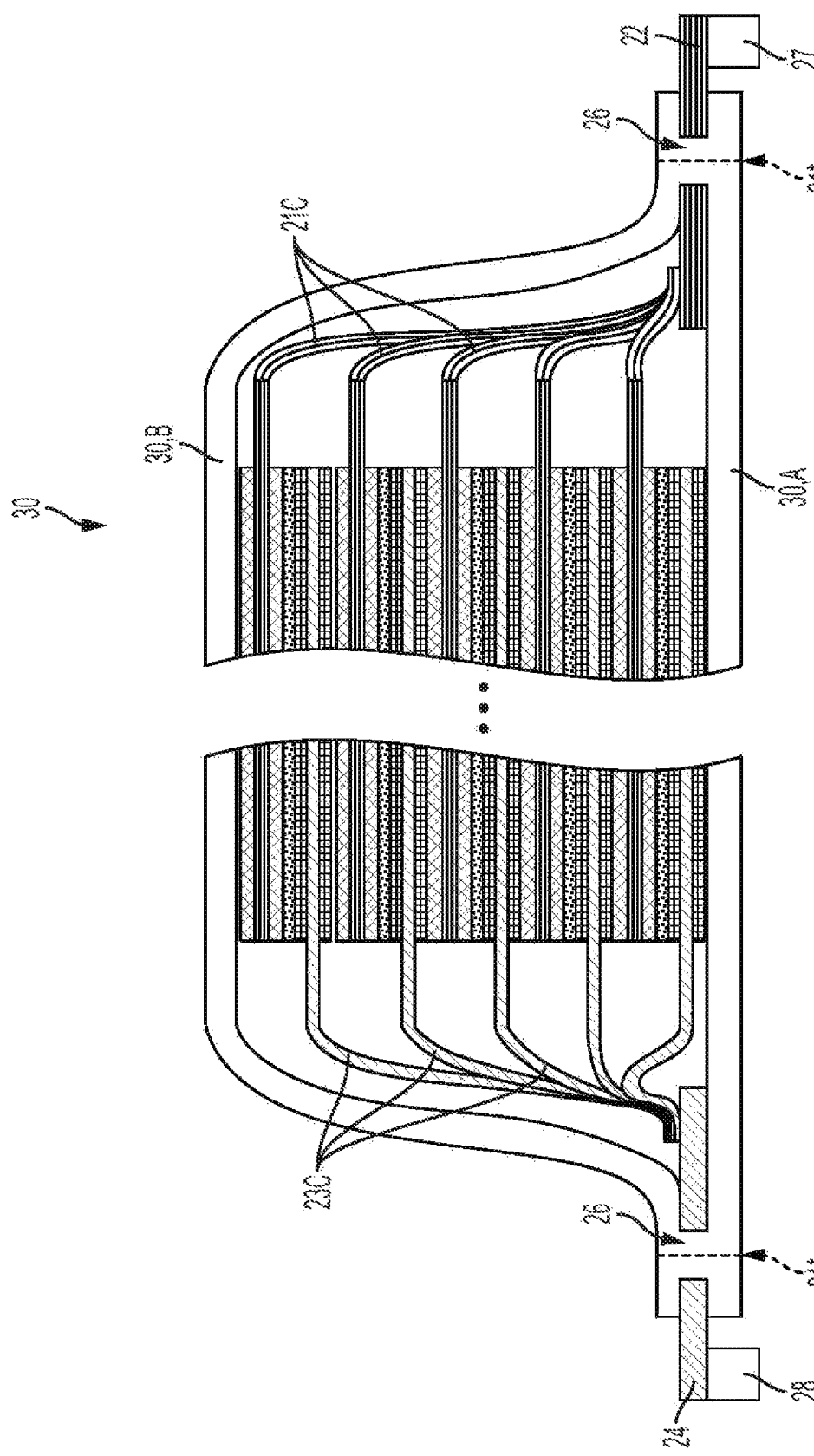
FIG. 4A illustrates a cross-sectional side-view of a battery cell with a sealed pouch, according to one or more embodiments.

FIG. 4A illustrates a cross-sectional side-view of a battery cell 20 with a sealed pouch 30. FIG. 3B illustrates a top view of a sealed battery pouch cell 30, including a peripheral seal 31. The battery cell 20 in FIGS. 4A-B include 5 electrode pairs, although the embodiment is intended to also include lesser or greater numbers of electrode pairs. As shown in FIG. 4A, each of the anode 21 current collectors 21C converge and join to an anode tab 22 and each of the cathode 23 current collectors 23C converge and join to a cathode tab 24. The current collectors can be ultrasonically welded to the tabs, for example. The anode tab 22 is electrically coupled to an anode busbar 27, and the cathode tab 24 is electrically coupled to a cathode busbar 28. In a battery pack (e.g., battery pack 12), a plurality of anode tabs 22 from different battery cells 20 can be joined to one or more anode busbars 27, and, similarly, a plurality of cathode tabs 24 from different battery cells 20 can be joined to one or more cathode busbars 28.

Figure 4B:
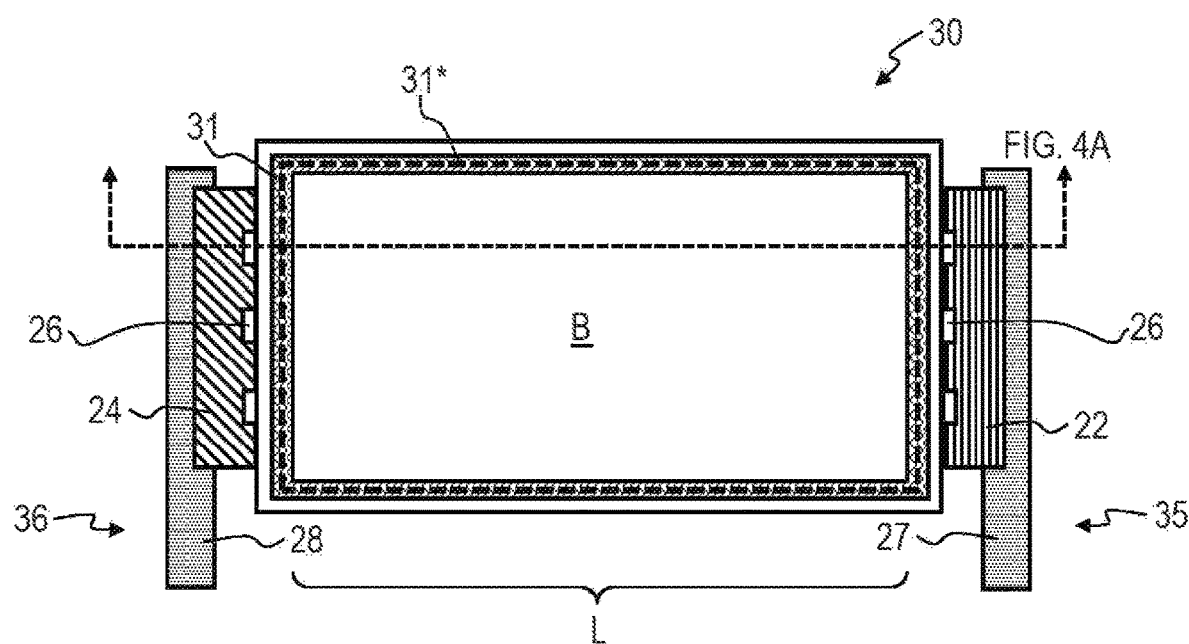
FIG. 4B illustrates a top view of a sealed battery pouch cell, according to one or more embodiments.

As shown in FIGS. 4A-B, the anode tab 22 and/or the cathode tab 24 can comprise one or more apertures 26 disposed along the peripheral seal path 31* such that a portion of the peripheral seal 31 is formed between the first pouch layer 30A and the second pouch layer 30B within the one or more apertures 26 of the anode tab 22 and/or the cathode tab 24. Because the seal 31 formed between the first pouch layer 30A and the second pouch layer 30B is typically more robust than the seal formed between the first or second pouch layers 30A,B and a cell tab (e.g., 22, 24), the one or more apertures enhance the strength and durability of the seal 31. Further, the anode tab 22 and/or the cathode tab 24 can be wider than traditional cells. A wider cell tab allows for longer internal connections between the cell tab and appurtenant cell current collectors which reduces the electrical resistance of the cell, increases the thermal conductivity in and out of the cell, and creates more uniform current flow into and out of the cell (i.e., into and out of the one or more appurtenant current collectors). Additionally, a wider cell tab allows for a longer external weld between the cell tab and the appurtenant busbar, which reduces weld resistance and increases thermal conductivity between the cell tab and the appurtenant current collectors.

As shown in FIG. 4B, the anode tab 22 can be disposed on a first side 35 of the pouch-type battery cell 30 and the cathode tab 24 can be disposed on a second side 36 of the pouch-type battery cell 30. The first side 35 and the second side 36 can define a length L, wherein a width is defined perpendicular to the length L. In some embodiments, the anode tab 22 can be at least 50%, at least 80% or at least 90% of a width of one or more anode current collectors 21C. Additionally or alternatively, the cathode tab 24 can be at least 50%, at least 80% or at least 90% of a width of one or more cathode current collectors 23C.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A pouch-type battery cell comprising:
   a first pouch layer;
   a second pouch layer;
   one or more electrode pairs disposed between the first pouch layer and the second pouch layer, wherein each electrode pair comprises an anode including an anode current collector and a cathode including a cathode current collector;

a peripheral seal defined by a peripheral seal path and joining the first pouch layer and the second pouch layer to form a pouch encasing the one or more electrode pairs, an anode tab electrically coupled to the one or more anode current collectors within the pouch and extending outward from the peripheral seal of the pouch; and a cathode tab electrically coupled to the one or more cathode current collectors within the pouch and extending outward from the peripheral seal of the pouch;

wherein the anode tab and/or the cathode tab comprise one or more apertures disposed along the peripheral seal path such that a portion of the peripheral seal is formed between the first pouch layer and the second pouch layer within the one or more apertures.

2. The pouch-type battery cell of claim 1, wherein the anode tab and the cathode tab each comprise one or more apertures disposed along the sealing path such that a portion of the peripheral seal is formed between the first pouch layer and the second pouch layer within the one or more apertures.

3. The pouch-type battery cell of claim 1, wherein the anode tab comprises a plurality of apertures disposed along the sealing path such that a portion of the peripheral seal is formed between the first pouch layer and the second pouch layer within the plurality of apertures.

4. The pouch-type battery cell of claim 1, wherein the cathode tab comprises a plurality of apertures disposed along the sealing path such that a portion of the peripheral seal is formed between the first pouch layer and the second pouch layer within the plurality of apertures.

5. The pouch-type battery cell of claim 1, wherein the peripheral seal is formed by applying heat to the first outer corrosion resistant polymer layer or the second outer corrosion resistant polymer along the peripheral seal path.

6. The pouch-type battery cell of claim 1, wherein the first pouch layer and the second pouch layer each comprise a first inner heat-activated polymer adhesive layer, a first middle aluminum layer, and a first outer corrosion resistant polymer layer.

7. The pouch-type battery cell of claim 1, wherein the anode tab is disposed on a first side of the pouch-type battery cell and the cathode tab is disposed on a second side of the pouch-type battery cell.

8. The pouch-type battery cell of claim 7, wherein the first side and the second side define a length, and wherein a width, defined perpendicular to the length, of the anode tab is at least 80% of a width of one or more anode current collectors.

9. The pouch-type battery cell of claim 7, wherein the first side and the second side define a length, and wherein a width, defined perpendicular to the length, of the cathode tab is at least 80% of a width of one or more cathode current collectors.

10. A battery pack comprising:
a plurality of pouch-type battery cells, each pouch-type battery cell comprising:
a first pouch layer;
a second pouch layer;
one or more electrode pairs disposed between the first pouch layer and the second pouch layer, wherein each electrode pair comprises an anode including an anode current collector and a cathode including a cathode current collector;
a peripheral seal defined by a peripheral seal path and joining the first pouch layer and the second pouch layer to form a pouch encasing the one or more electrode pairs, an anode tab electrically coupled to the one or more anode current collectors within the pouch and extending outward from the peripheral seal of the pouch;

a cathode tab electrically coupled to the one or more cathode current collectors within the pouch and extending outward from the peripheral seal of the pouch;

an anode busbar electrically coupled to a plurality of anode tabs; and a cathode busbar electrically coupled to a plurality of cathode tabs;

wherein the anode tab and/or the cathode tab of one or more pouch-type battery cells comprise one or more apertures disposed along the peripheral seal path such that a portion of the peripheral seal is formed between the first pouch layer and the second pouch layer within the one or more apertures.

11. The battery pack of claim 10, wherein the anode tab and the cathode tab of one or more pouch-type battery cells each comprise one or more apertures disposed along the sealing path such that a portion of the peripheral seal is formed between the first pouch layer and the second pouch layer within the one or more apertures.

12. The battery pack of claim 10, wherein the anode tab of one or more pouch-type battery cells comprises a plurality of apertures disposed along the sealing path such that a portion of the peripheral seal is formed between the first pouch layer and the second pouch layer within the plurality of apertures.

13. The battery pack of claim 10, wherein the cathode tab of one or more pouch-type battery cells comprises a plurality of apertures disposed along the sealing path such that a portion of the peripheral seal is formed between the first pouch layer and the second pouch layer within the plurality of apertures.

14. The battery pack of claim 10, wherein the peripheral seal of one or more pouch-type battery cells is formed by applying heat to the first outer corrosion resistant polymer layer or the second outer corrosion resistant polymer along the peripheral seal path.

15. The battery pack of claim 10, wherein the first pouch layer and the second pouch layer of one or more pouch-type battery cells each comprise a first inner heat-activated polymer adhesive layer, a first middle aluminum layer, and a first outer corrosion resistant polymer layer.

16. The battery pack of claim 10, wherein the anode tab of one or more pouch-type battery cells is disposed on a first side of each pouch-type battery cell and the cathode tab of one or more pouch-type battery cells is disposed on a second side of each pouch-type battery cell.

17. The battery pack of claim 16, wherein the first side and the second side of each pouch-type battery cell defines a length, and wherein a width, defined perpendicular to the length, of the anode tab is at least 80% of a width of one or more anode current collectors.

18. The battery pack of claim 16, wherein the first side and the second side define a length, and wherein a width, defined perpendicular to the length, of the cathode tab is at least 80% of a width of one or more cathode current collectors.

19. The battery pack of claim 10, wherein the battery pack powers a vehicle.

* * * * *